United States Patent
Kuczynski et al.

(10) Patent No.: US 6,177,047 B1
(45) Date of Patent: *Jan. 23, 2001

(54) WATER-TREATMENT COMPOSITION AND METHOD OF USE

(76) Inventors: Krzysztof Kuczynski, Heylenblok 3, B-1640 Rhode-St. Genèse; Michel Alex Omer Ledent, Rue des Colonies, 12, B-5003 Saint-Marc, both of (BE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/893,608

(22) Filed: Jul. 11, 1997

(30) Foreign Application Priority Data

Jul. 30, 1996 (EP) .................................................. 96870096

(51) Int. Cl.$^7$ .................................................. C23F 11/167
(52) U.S. Cl. ........................... 422/15; 210/700; 252/181; 252/389.21; 252/389.52; 422/19
(58) Field of Search .................................... 210/699, 700; 252/389.2, 389.21, 389.52, 181; 422/15, 19

(56) References Cited

U.S. PATENT DOCUMENTS

| | | | |
|---|---|---|---|
| 3,431,217 | 3/1969 | Hwa | 252/389 |
| 3,483,133 | 12/1969 | Hatch et al. | 252/389 |
| 3,547,817 * | 12/1970 | Hansen, Jr. et al. | 210/700 |
| 3,564,047 * | 2/1971 | Irani et al. | 210/700 |
| 3,668,138 | 6/1972 | Hoover et al. | 252/181 |
| 3,671,448 * | 6/1972 | Kowalski | 210/700 |
| 3,699,048 * | 10/1972 | Krueger et al. | 210/700 |
| 3,960,576 | 6/1976 | Carter et al. | 106/14 |
| 4,204,953 * | 5/1980 | Hodgson et al. | 210/700 |
| 4,692,317 | 9/1987 | Greaves | 422/15 |
| 4,986,925 | 1/1991 | Fiske | 252/70 |
| 5,230,819 | 7/1993 | Hirozawa et al. | 252/78.5 |
| 5,320,779 * | 6/1994 | Fivizzani | 210/700 |

FOREIGN PATENT DOCUMENTS

| | | |
|---|---|---|
| 2061249 | 2/1992 | (CA) . |
| 0364030A1 | 4/1990 | (EP) . |
| 59-100272 | 6/1984 | (JP) . |
| 1311287 | 6/1996 | (SU) . |

OTHER PUBLICATIONS

Merck INDEX 10$^{th}$ Edition.
Abstract SU 1311287 discloses that the inhibitor is based on oxyethylidene—diphosphonic acid and zinc salt. (Jun. 6, 1996).

* cited by examiner

*Primary Examiner*—Peter A. Hruskoci
(74) *Attorney, Agent, or Firm*—Thompson Colburn LLP; Gordon F. Sieckmann; Paul A. Lesko

(57) ABSTRACT

The invention herein relates to water-treatment technology, namely compositions comprising a phosphonic acid, a zinc salt and a metal salt. A preferred metal salt is aluminum tri-chloride whereas amino tris methylene phosphonic acid is a preferred phosphonic species. The use of the compositions in water-treatment methods is also described.

5 Claims, No Drawings

WATER-TREATMENT COMPOSITION AND METHOD OF USE

This application claims the benefit of priority under 35 U.S.C. §119 of EPO No. 96870096.3 filed Jul. 30, 1996.

This invention relates to water-treatment technology, particularly industrial water-treatment, to compositions suitable for use in water-treatment operations and method for the treatment of aqueous systems. The compositions of the invention comprise phosphonates, such as aminopolymethylene phosphonates, zinc salts and source of metal ions. In the method aspects, comparable ingredients are used in narrowly defined levels.

The art relating to water-treatment technology, including water-treatment compositions and methods for the treatment of aqueous systems, is crowded and diverse. Industrial water-treatment technology aims at providing cumulative benefits including corrosion inhibition properties and effective control of scale formation in, for example, cooling circuits. A variety of inorganic corrosion-inhibitor compounds has in the past been suggested and/or used in aqueous systems. The use of the like compounds, for example chromates, nitrites, sulfates, phosphates and polyphosphates, was limited for technical, toxicological and/or environmental reasons. Combinations of polyphosphonates and zinc salts have more recently found widespread application and were known to exhibit effective corrosion inhibition and scale inhibition properties. However, the use of polyphosphonate/zinc salt combinations is known to be subject to stability deficiencies, e.g. precipitation which can adversely affect the suitability for beneficially using such combinations in industrial water treatment. U.S. Pat. No. 5,230,819 describes the use of diphosphonic acids as corrosion inhibitors in liquid systems. CN-A-2.061.249 describes the use of cationic alkyl phosphonium as corrosion inhibitors in aqueous systems. U.S. Pat. No. 4,692,317 describes method for inhibiting corrosion in aqueous systems by adding to the system a phosphono-hydroxyacetic acid or a salt thereof and a selected cationic polymer. The known technology, while marginally effective under narrowly-defined in-use parameters, was known to exhibit substandard storage stability properties, particularly precipitation of active ingredient combinations and correspondingly diminished water-treatment properties inclusive of reduced corrosion inhibition and marginal hardness scale control.

It is therefore an object of this invention to generate water-treatment technology capable of simultaneously providing excellent scale-inhibition properties and effective corrosion inhibition benefits.

It is a further object of this invention to provide water-treatment technology, particularly compositions, which are not subject to stability problems which might reduce inhibitor properties.

Yet another object of this invention is to generate superior water-treatment technology commensurate with ever-increasing requirements.

The foregoing and other objects can now be beneficially met with the aid of the water-treatment technology of this invention, particularly the compositions and the use thereof in industrial water-treatment.

The technology of this invention relates to water-treatment compositions capable of inhibiting metal corrosion comprising from a: 5% to 60% by weight of phosphonic acid or a salt thereof having a formula selected from the following formulae:

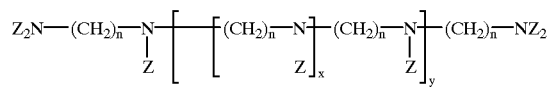
(A)

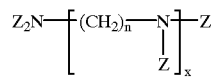
($B_1$)

$Z_2N(CH_2-O-CH_2)_{\overline{n}}-NZ_2$
($B_2$)

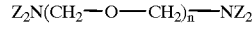
(C)

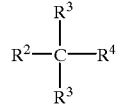
(D)

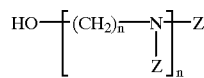
(E)

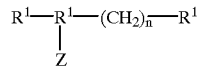
(F)

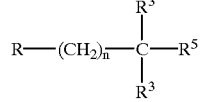

(H) N-oxides of the aminophosphonates of formulae: (A), (B), (C), (D) and (F) wherein
Z is —$CHR^1PO_3R_2$;
R is H, $CH_3$, $C_2H_5$ or M;
M is a metal ion or ammonium;
$R^1$ is H, $CH_3$, $CR_3$, $C_6H_5$, $SO_3H$, $CH_2COOH$;
$R^2$ is an alkyl group having from 1 through 5 carbon atoms;
$R^3$ is $PO_3R_2$, H;
$R^4$ is OH, $NH_2$, $N(R^1)_2$, $N(Z)_2$, COOH;
$R^5$ is $CH_2CH_2COOH$, $N(CH_2OH)_2$;
n is 1–6, preferably 2–4;
m is 2–6, preferably 2–41;
x is 0–6, preferably 0–3;
y is 0–6, preferably 0–1;

b: a water-soluble or water dispersible zinc salt in a level such that the molar ratio of said zinc salt to said phosphonic acid is in the range of from 1:2 to 6:1; and c: a source of water-soluble or water-dispersible metal salt of aluminum, boron, silicon, gallium, germanium, indium and titanium in a level of from 0.01% to 1.0% by weight on the basis of the metal constituent of the salt.

The metal salt is preferably represented by water-soluble aluminum salts. A preferred phosphonic acid can be represented by amino-tri-methylenephosphonic acid.

In the method aspect of the invention aqueous systems are treated by adding thereto a phosphonic acid or salt thereof having a formula selected from the group of (A) through (H) in a level of from 1 ppm to 1000 ppm, more preferably 10 ppm to 500 ppm in combination with a water-soluble or water-dispersible zinc salt and a source of water-soluble or water-dispersible metal salt of aluminum, boron, silicone, gallium, geranium, indium and titanium in a level from 0.1 ppm to 100 ppm on the basis of the metal constituent of the salt. The zinc salt is used in the claimed method in a level such that the molar ratio of said zinc salt to said phosphonic acid is in the level of from 1:2 to 6:1.

The %-indication stand, unless specified differently, for "% by weight". The terms "water-treatment" and "industrial water-treatment" are used interchangeably.

The water-treatment compositions herein comprise from a phosphonic acid, or a salt thereof, having a formula selected from the group of formulae annotated (A- through (H). The phosphonic component generally represents from 5% to 60%, preferably from 8% to 50% of the treatment composition. Optimized levels can vary depending upon the contemplated utilization and the quantitative and qualitative selections of complementary essential ingredients. Level fine-tuning can be effected routinely based on day-to-day measures and experiences.

The phosphonic acid component can be represented by known species including those having established water treatment functionality. The individually recited compounds (A) through (H) can be used as such or in admixture.

Specific examples of formula (A) are those wherein R is H or M, $R^1$ is H, x is 0 or 1, y is 0 or 1, n is 3 and m is 2. Individual species of (A) include diethylenetriamine penta (methylenephosphonic acid) and ethylenedipropylene tetraamino hexa(methylenephosphonic acid).

Specific examples of formula (B) carry the following moieties: x is 0 or 1 and n is 2 to 6. Individual species of ($B_1$) are amino tris(methylenephosphonic acid), hexamethylenediamine tetra(methylenephosphonic acid) and ethylenediamine tetra(methylenephosphonic acid) whereas n in $B_2$ can from 1 to $\epsilon$5, preferably 2 to 3.

Formula (C) can be represented by individual species wherein $R^2$ is $C_{1-3}$ alkyl, $R^3$ is $PO_3H_2$, and $R^4$ is OH or N(Z)$_2$. Operable species of formula (C) are 1-hydroxy ethylidene(1,1-diphosphonic acid) and aminoethane-1,1-diphosphonic acid,N,N-bis(methylenephosphonic acid).

In Examples of (D) n can have a value of 1 or 2. A specific example of a (D) compound is ethanolaminedimethylene phosphonic acid.

Formula (E) can be represented by butan-2-phosphono-1,2,4-tricarboxylic acid whereas in formula (F) R is H to thus produce an operable compound namely N,N-dihydroxymethylethane-1,1-diphosphonic acid.

The phosphonic acid component can, depending upon pH conditions, be represented by the acid as such, by the corresponding salts, inclusive of alkali metal salts, such as sodium, potassium and lithium, earth-alkali metal salts e.g. calcium or magnesium, or ammonium and/or ethanol amines inclusive of mono- and di-species.

The phosphonic acid components are known ingredients which can be produced by means of conventional methods.

The compositions and methods of this invention employ a water-soluble and/or water-dispersible zinc salt. The terms "soluble" and dispersible" refer to the medium of application. Thus in the context of the contemplated water-treatment application, the aqueous medium represent generally more than 95%, usually more than 98% water. The term "dispersible" is meant to express "stably dispersible" i.e. non-precipitating. The water-soluble zinc salts are preferred.

The zinc salt can be selected from known species routinely available. While zinc chloride can be preferred for reasons of convenience and availability, further examples of suitable species include nitrates, sulfates and acetates.

The zinc salt is used in a level such that the molar ratio of zinc salt to phosphonic acid, or the salt thereof is in the range of from 1:2 to 6:1, more preferably from 1:1 to 4:1.

The composition and the method herein further require a source of water-soluble or water-dispersible metal salt. The terms "water-soluble" and "water-dispersible", in relation to metal salt, are defined as for the zinc salt.

The metal ion can be represented by aluminum, boron, silicon, gallium, germanium, indium and titanium. For reasons of convenience and economics, aluminum salts are frequently preferred in relation to large-scale industrial water-treatment.

However, other metal ions such as e.g. silicon, gallium and titanium can be utilized in connection, for example with precision equipment.

The metal salt is generally used in the composition aspect herein in a level of from 0.01% to 1% more preferably of from 0.02 to 0.6%. Aluminum chloride is for practical reasons preferred. Other acceptable aluminum salts include nitrates, sulfates, acetates and whatever soluble and/or dispersible species can meet the constraints of a particular composition and/or application. Such optimized selections are routine practice.

In the method aspect of this invention, the phosphonic acid component is used in a level of from 1 ppm to 1000 ppm, preferably from 5 ppm to 500 ppm. A preferred phosphonic acid is represented by a compound having the formula

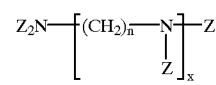

wherein n is 2–6, preferably 2–4, x is 0 or 1 and Z is $CHR^1PO_3R_2$. Amino trismethylenephosphonic acid is a preferred compound.

The amino salt is used in the method aspect herein in a level such that the molar ratio of said zinc salt to said phosphonic acid is in the range of from 1:2 to 6:1, preferably 1:1 to 4:1.

The metal salt is, in the method aspect, preferably represented by a water-soluble aluminum salt which is used in a level of from 0.1 ppm to 100 ppm, preferably 0.1 ppm to 60 ppm.

In preferred embodiments of this invention, an acid e.g. hydrochloric, sulfuric, nitric or sulfonic acid, preferably hydrochloric, acid is added to the essential ternary component mixture. The hydrochloric acid is present in a level such that the weight ratio of phosphonic acid +water-soluble and/or water-dispersible zinc salt is of from 15:1 to 1:1, more preferably 10:1 to 3:1.

The compositions of this invention can be in any acceptable state, including solid, pasty and/or liquid concentrate, depending upon he qualitative and quantitative selections of the essential components. The preparation/manufacture of the compositions requires standard measures well know, as such. The compositions, or the individual ingredients, can be added with respect to the water-treatment application (methods).

In addition to the essential and preferred ingredients described above, the compositions and the methods of this invention can contain additive levels of selected ingredients which are utilized in art established levels for their known functionality. Examples of the like ingredients can, for example, include surfactants, antibacterial agents, perfumes, deodorants, drag-reducing agents, chelants, and suds-regulants. The total level of such additives is generally below 10% of the composition, and below 15%, expressed by reference of the sum of the essential components +the optional acid component.

The inventive benefits are illustrated with the aid of the comparative showings below.

EXAMPLES

The benefits flowing from the use of the claimed invention are illustrated with the aid of comparative showings as described in what follows.

Comparative compositions and executions of the claimed technology are prepared containing the listed components in the recited proportions.

These compositions were tested for storage stability/absence of precipitation at ambiant, +/−22° C., temperature. The formation of precipitates is clearly non-desirable. "C" means comparative example and "E" stands for example.

| Component in % by wt | C-I | E-I | E-II |
|---|---|---|---|
| ATMP (*) | 12.5 | 12.5 | 12.5 |
| ZnCl$_2$ (**) | 5.8 | 5.8 | 5.8 |
| HCl (100%) | 3.6 | 3.6 | 3.6 |
| AlCl$_3$ | 0 | 0.4 | 0.5 |
| Water | | up to 100% | |

(*) ATMP = aminotris(methlenephosphonic acid)
(**) Zn/ATMP Molar Ratio = 1.02:1

The testing results were as follows:

| Stability (after days) | C-I | E-I | E-II |
|---|---|---|---|
| 4 | n | y | y |
| 14 | n | y | y |
| 28 | n | y | y |

| Component in % by wt | C-II | C-III | C-IV | C-V | E-III | E-IV | E-V | E-VI |
|---|---|---|---|---|---|---|---|---|
| ATMP | 30 | 30 | 30 | 30 | 30 | 30 | 30 | 30 |
| ZnCl$_2$ | 14 | 14 | 14 | 14 | 14 | 14 | 14 | 14 |
| HCl (100%) | 5 | 5.5 | 6 | 7.5 | 5 | 5.5 | 6.0 | 7.5 |
| AlCl$_3$ | — | — | — | — | 0.5 | 0.5 | 0.5 | 0.5 |
| Water | | | | up to 100% | | | | |
| Molar ratio Zn/ATMP | | | | 1.02/1 | | | | |

Stability testing results were as follows:

| Stability (after days) | C-II | C-III | C-IV | C-V | E-III | E-IV | E-V | E-VI |
|---|---|---|---|---|---|---|---|---|
| 4 | n | n | n | n | y | y | y | y |
| 14 | n | n | n | n | y | y | y | y |
| 28 | n | n | n | n | y | y | y | y |

| Component in % by wt | C-VI | C-VII | C-VIII | E-VII | E-VIII | E-IX |
|---|---|---|---|---|---|---|
| ATMP | 10 | 10 | 10 | 10 | 10 | 10 |
| ZnCl$_2$ | 4.55 | 9.1 | 18.23 | 4.55 | 9.1 | 18.23 |
| HCl (100%) | 3 | 3 | 3 | 3 | 3 | 3 |
| AlCl$_3$ | — | — | — | 0.5 | 0.5 | 0.5 |
| Water | | | up to 100% | | | |
| Molar ratio ZB/ATMP | 1:1 | 2:1 | 4:1 | 1:1 | 2:1 | 4:1 |

| Stability (after days) | C-VI | C-VII | C-VIII | E-VII | E-VIII | E-IX |
|---|---|---|---|---|---|---|
| 7 (3% HCl) | n | n | n | y | y | y |
| 7 (4% HCl) | n | n | n | y | y | y |
| 7 (5% HCl) | n | n | n | y | y | y |

| Component in % by wt | C-IX | C-X | C-XI | E-X | E-XI | E-XII |
|---|---|---|---|---|---|---|
| ATMP | 15 | 15 | 15 | 15 | 15 | 15 |
| ZnCl$_2$ | 4.55 | 9.1 | 18.23 | 4.55 | 9.1 | 18.23 |
| HCl (100%) | 4 | 4 | 4 | 4 | 4 | 4 |
| AlCl$_3$ | — | — | — | 0.5 | 0.5 | 0.5 |
| Water | | | up to 100% | | | |
| Molar ratio Zn/ATMP | 1:1 | 2:1 | 4:1 | 1:1 | 2:1 | 4:1 |

| Stability (after days) | C-IX | C-X | C-XI | E-X | E-XI | E-XII |
|---|---|---|---|---|---|---|
| 7 | n | n | n | y | n | n |
| 7 (5% HCl) | n | n | n | y | y | n |
| 7 (6% HCl) | n | n | n | y | y | y |

What is claimed is:

1. A water treatment composition capable of inhibiting metal corrosion comprising from:
    a: 5% to 50% by weight of amino-trimethylene phosphonic acid or salt thereof;
    b: zinc chloride in a level such that the molar ratio of zinc chloride to phosphonic acid is in the range of from 1:2 to 6:1,
    c: a water-soluble aluminum salt in a level of from 0.02% to 0.6% by weight based on the aluminum constituent of the salt, and
    d: which composition in addition contains hydrochloric acid whereby the weight ratio of phosphonic acid +zinc chloride:hydrochloric acid is of from about 15:1 to 1:1.

2. A method for the treatment of aqueous systems capable of conferring improved corrosion inhibition properties to metal parts which are exposed to said aqueous systems comprising adding to said systems:
    a: aminotris(methylenephosphonic acid) in a level of from 5 ppm to 500 ppm;
    b: a zinc chloride in a level such that the molar ratio of said zinc chloride to said aminotris (methylenephosphonic acid) is in the range of from 1:2 to 6:1;
    c: hydrochloric acid in a weight ratio of aminotris (methylenephosphonic acid)+zinc chloride:hydrochloric acid from about 15:1 to 1:1; and
    d: a source of water-soluble aluminum salt in a level of from 0.1 ppm to 60 ppm expressed on the basis of the aluminum constituent of said aluminum salt.

3. A water treatment composition capable of inhibiting metal corrosion comprising from:
    a: 5% to 50% by weight of of amino-trimethylene phosphonic acid or salt thereof;
    b: zinc chloride in a level such that the molar ratio of zinc chloride to phosphonic acid is in the range of from 1:2 to 6:1, and
    c: a water-soluble aluminum salt in a level of from 0.01% to 0.6% by weight based on the aluminum constituent of said aluminium salt, and wherein said composition in addition contains hydrochloric acid whereby the weight ratio of phosphonic acid and zinc chloride:hydrochloric acid is from 15:1 to 1:1.

4. A method for the treatment of aqueous systems capable of conferring improved corrosion inhibition properties to metal parts which are exposed to said aqueous systems comprising adding to said systems:
   a: a phosphonic acid or a salt thereof having the formula:

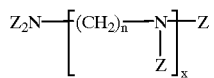

wherein n is 2–6,
   x is 0 or 1; and
   z is $CHR^1PO_3R_2$
   in a level of from 5 ppm to 500 ppm;
   b: a water-soluble zinc salt in a level such that the molar ratio of said zinc salt to said phosphonic acid is in the range of from 1:2 to 6:1; and
   c: a source of water-soluble aluminum salt in a level of from 0.1 ppm to 100 ppm expressed on the basis of the aluminum constituent of said aluminum salt and additional added hydrochloric acid in a level such that the weight ratio of phosphonic acid and zinc chloride:hydrochloride acid is from 15:1 to 1:1.

5. A method for the treatment of aqueous systems capable of conferring improved corrosion inhibition properties to metal parts which are exposed to said aqueous systems comprising adding to said systems:
   a: an aminotris(methylenephosphonic acid);
   b: a water-soluble zinc salt in a level such that the molar ratio of said zinc salt to said phosphonic acid is in the range of from 1:2 to 6:1; and
   c: a source of water-soluble aluminum salt in a level of from 0.1 ppm to 100 ppm expressed on the basis of the aluminum constituent of said aluminum salt and additional added hydrochloric acid in a level such that the weight ratio of phosphonic acid and zinc chloride:hydrochloride acid is from 15:1 to 1:1.

* * * * *